(12) United States Patent
Liu et al.

(10) Patent No.: US 7,088,877 B2
(45) Date of Patent: Aug. 8, 2006

(54) METHOD AND APPARATUS FOR TUNING A BRAGG GRATING IN A SEMICONDUCTOR SUBSTRATE

(75) Inventors: Ansheng Liu, Cupertino, CA (US); Mario J. Paniccia, Santa Clara, CA (US); Remus Nicolaescu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 09/881,218

(22) Filed: Jun. 13, 2001

(65) Prior Publication Data

US 2002/0197011 A1    Dec. 26, 2002

(51) Int. Cl.
*G02F 1/295*    (2006.01)

(52) U.S. Cl. .................. 385/10; 385/2; 385/8; 385/129

(58) Field of Classification Search ............ 385/2, 385/8, 10, 37, 129, 130, 132
See application file for complete search history.

(56) References Cited

U.S. PATENT DOCUMENTS

| | | | |
|---|---|---|---|
| 4,518,219 A | 5/1985 | Leonberger et al. | |
| 4,725,110 A | 2/1988 | Glenn et al. | |
| 4,815,084 A | 3/1989 | Scifres et al. | |
| 4,984,894 A * | 1/1991 | Kondo ..................... | 356/632 |
| 5,082,342 A | 1/1992 | Wight et al. | |
| 5,159,601 A | 10/1992 | Huber | |
| 5,195,161 A | 3/1993 | Adar et al. | |
| 5,212,745 A | 5/1993 | Miller | |
| 5,237,576 A | 8/1993 | DiGiovanni et al. | |
| 5,247,528 A | 9/1993 | Shinozaki et al. | |
| 5,285,274 A | 2/1994 | Tanno et al. | |
| 5,315,437 A | 5/1994 | Alfano et al. | |
| 5,379,318 A | 1/1995 | Weber | |
| 5,418,802 A * | 5/1995 | Chwalek ..................... | 372/20 |
| 5,446,809 A | 8/1995 | Fritz et al. | |

(Continued)

FOREIGN PATENT DOCUMENTS

EP    1094574 A1    4/2001

OTHER PUBLICATIONS

Studenkov, P.V., "Asymmetric Twin-Waveguide 1.55-μm Wavelength Laser with a Distributed Bragg Reflector", *IEEE Photonics Technology Letters*, vol. 12, No. 5, pp. 468-470, May 2000.

(Continued)

*Primary Examiner*—Drew A. Dunn
*Assistant Examiner*—Joshua L. Pritchett
(74) *Attorney, Agent, or Firm*—Kevin A. Reif

(57) ABSTRACT

A tunable Bragg grating method and apparatus. In one aspect of the present invention, a method according to an embodiment of the present invention includes directing an optical beam into a first end of an optical path having the first end and a second end disposed in a semiconductor substrate, reflecting a first portion of the optical beam having a first center wavelength back out from the first end of the optical path and tuning the optical path to reflect a second portion of the optical beam having a second center wavelength back out from the first end of the optical path. In one embodiment, the Bragg grating is tuned with a heater used to adjust a temperature of the semiconductor substrate. In another embodiment, charge in charge modulated regions along the optical path is modulated to tune the Bragg grating.

14 Claims, 5 Drawing Sheets

U.S. PATENT DOCUMENTS

| | | | | |
|---|---|---|---|---|
| 5,448,404 | A | 9/1995 | Schrenk et al. | |
| 5,467,732 | A * | 11/1995 | Donnelly et al. | 438/7 |
| 5,493,113 | A | 2/1996 | Dunphy et al. | |
| 5,511,083 | A | 4/1996 | D'Amato et al. | |
| 5,511,142 | A | 4/1996 | Horie et al. | |
| RE35,516 | E | 5/1997 | Henry et al. | |
| 5,627,927 | A | 5/1997 | Udd | |
| 5,636,309 | A | 6/1997 | Henry et al. | |
| 5,668,900 | A | 9/1997 | Little et al. | |
| 5,689,358 | A | 11/1997 | Nakao et al. | |
| 5,751,466 | A | 5/1998 | Dowling et al. | |
| 5,764,829 | A | 6/1998 | Judkins et al. | |
| 5,781,268 | A | 7/1998 | Liu et al. | |
| 5,796,902 | A | 8/1998 | Bhat et al. | |
| 5,801,378 | A | 9/1998 | Hane et al. | |
| 5,907,427 | A | 5/1999 | Scalora et al. | |
| 5,915,051 | A | 6/1999 | Damask et al. | |
| 6,011,881 | A | 1/2000 | Moslehi et al. | |
| 6,018,480 | A | 1/2000 | Baney | |
| 6,061,481 | A | 5/2000 | Heidrich et al. | |
| 6,075,908 | A | 6/2000 | Paniccia et al. | |
| 6,141,469 | A | 10/2000 | Kashyap | |
| 6,172,791 | B1 | 1/2001 | Gill et al. | |
| 6,221,565 | B1 * | 4/2001 | Jain et al. | 430/321 |
| 6,233,381 | B1 | 5/2001 | Borrelli et al. | |
| 6,259,529 | B1 | 7/2001 | Sorin et al. | |
| 6,266,464 | B1 | 7/2001 | Day et al. | |
| 6,268,953 | B1 | 7/2001 | Maloney | |
| 6,327,036 | B1 | 12/2001 | Bao et al. | |
| 6,330,255 | B1 | 12/2001 | Hung | |
| 6,330,383 | B1 | 12/2001 | Cai et al. | |
| 6,337,737 | B1 | 1/2002 | Chang et al. | |
| 6,343,167 | B1 | 1/2002 | Scalora et al. | |
| 6,363,202 | B1 * | 3/2002 | Goodfellow | 385/140 |
| 6,373,872 | B1 | 4/2002 | Deacon | |
| 6,374,013 | B1 | 4/2002 | Whiteaway et al. | |
| 6,411,756 | B1 | 6/2002 | Sadot et al. | |
| 6,438,277 | B1 | 8/2002 | Eggleton et al. | |
| 6,459,533 | B1 | 10/2002 | Clapp et al. | |
| 6,480,513 | B1 * | 11/2002 | Kapany et al. | 372/20 |
| 6,529,649 | B1 | 3/2003 | Soole | |
| 6,538,783 | B1 | 3/2003 | Stephens | |
| 6,546,160 | B1 | 4/2003 | Schunk | |
| 6,600,864 | B1 * | 7/2003 | Samara-Rubio et al. | 385/131 |
| 6,628,450 | B1 | 9/2003 | Samara-Rubio | |
| 6,661,937 | B1 | 12/2003 | Sobiski et al. | |
| 6,674,928 | B1 | 1/2004 | Johnson et al. | |
| 6,748,138 | B1 | 6/2004 | Wang et al. | |
| 6,775,427 | B1 | 8/2004 | Evans | |

| Pub. No. | | Date | Inventor(s) |
|---|---|---|---|
| 2002/0025097 | A1 | 2/2002 | Cooper et al. |
| 2002/0085810 | A1 | 7/2002 | Lee et al. |
| 2002/0113966 | A1 | 8/2002 | Shchegrov et al. |
| 2002/0197011 | A1 | 12/2002 | Liu et al. |
| 2003/0013438 | A1 | 1/2003 | Darby |
| 2003/0020865 | A1 | 1/2003 | Hoke |
| 2003/0021305 | A1 | 1/2003 | Lundqvist |
| 2003/0025976 | A1 | 2/2003 | Wipiejewski |
| 2003/0086155 | A1 | 5/2003 | Ovadia et al. |
| 2003/0086655 | A1 | 5/2003 | Deacon |
| 2003/0091086 | A1 | 5/2003 | Sahara et al. |
| 2003/0091287 | A1 | 5/2003 | Lam et al. |
| 2003/0099018 | A1 | 5/2003 | Singh et al. |
| 2004/0033020 | A1 | 2/2004 | LoCascio et al. |
| 2004/0052522 | A1 | 3/2004 | Fishteyn et al. |

OTHER PUBLICATIONS

Kenneth, O., "Fiber Gragg Grating Technology Fundamentals and Overview", *Journal of Lightwave Technology*, vol. 15, No. 8, pp. 1263-1276, Aug. 1997.

Soldano L.B., "Optical Multi-Mode Interference Devices Based on Self-Imaging: Principles and Applications", *Journal of Lightwave Technology*, vol. 13, No. 4, pp. 615-627, Apr. 1995.

Willner, A.E., "Tunable Compensation of Channel Degrading Effects Using Nonlinearly Chirped Passive Fiber Bragg Gratings", *IEEE Journal of Selected Topics in Quantum Electronics*, vol. 5, No. 5, pp. 1298-1311, Sep./Oct. 1999.

Giles, C.R., "Lightwave Applications of Fiber Bragg Gratings", *Journal of Lightwave Technology*, vol. 15, No. 8, pp. 1391-1404, Aug. 1997.

Sugden, K., "Fabrication and Characterization of Bandpass Filters Based on Concatenated Chirped Fiber Gratings", *Journal of Lightwave Technology*, vol. 15, No. 8, pp. 1424-1432, Aug. 1997.

Wiesmann, D. et al., "Apodized Surface-Corrugated Gratings with Varying Duty Cycles", *IEEE Photonics Technology Letters*, vol. 12, No. 6, pp. 639-641, Jun. 2000.

Shibata, Y. et al., "Coupling Coefficient Modulation of Waveguide Grating Using Sampled Grating Using Sampled Grating," *IEEE Photonics Technology Letters*, vol. 6, No. 10, pp. 1222-1224, Oct. 1994.

Bilodeau, F. et al., "High-Return-Loss Narrowband All-Fiber Bandpass Bragg Transmission Filter", IEEE Photonic Technology Letters, vol. 6, No. 1, Jan. 1994, pp. 80-82.

* cited by examiner

US 7,088,877 B2

METHOD AND APPARATUS FOR TUNING A BRAGG GRATING IN A SEMICONDUCTOR SUBSTRATE

BACKGROUND OF THE INVENTION

1. Field of the Invention

The present invention relates generally to optical devices and, more specifically, the present invention relates to Bragg grating optical devices.

2. Background Information

The need for fast and efficient optical-based technologies is increasing as Internet data traffic growth rate is overtaking voice traffic pushing the need for optical communications. Commonly used optical components include diffraction gratings, thin-film filters, fiber Bragg gratings, and arrayed-waveguide gratings.

A fiber Bragg grating is an optical fiber device that includes an optical fiber with periodic changes in the refractive index of fiber core materials along the fiber length, which may be formed by exposure of the photosensitive core to an intense optical interference pattern. With the changes in the refractive index along the fiber length, optical beams at a particular wavelength are reflected by the fiber Bragg grating while other wavelengths are allowed to propagate through the fiber.

A limitation with known fiber Bragg gratings is that the particular wavelength that is reflected by the fiber Bragg grating is substantially fixed. Consequently, if different wavelengths of light are to be reflected, different fiber Bragg gratings are utilized. In some known fiber Bragg gratings, nominal adjustments to the reflected wavelength may be provided by physically or mechanically stretching the optical fiber of the fiber Bragg grating to modify the length of the optical fiber. The disadvantage of this technique is that the amount of adjustment to the reflected wavelength is relatively small and the optical fiber may suffer damage from the physical stress and strain of the stretching.

BRIEF DESCRIPTION OF THE DRAWINGS

The present invention is illustrated by way of example and not limitation in the accompanying figures.

DETAILED DESCRIPTION

Methods and apparatuses for tuning a Bragg grating disposed in a semiconductor substrate are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based tunable Bragg grating is provided in a fully integrated solution on a single integrated circuit chip. In one embodiment, an infrared or near infrared input optical beam is selectively reflected at a tunable center wavelength with a silicon-based optical grating or filter in accordance with the teachings of the present invention. As will be discussed, the reflected wavelength bandwidth is relatively narrow. The center wavelength is shifted using various techniques including thermal or plasma optical effects in for example silicon. Embodiments of the presently described semiconductor-based tunable Bragg grating may be utilized in broadband optical networking systems or the like.

Figure 1:
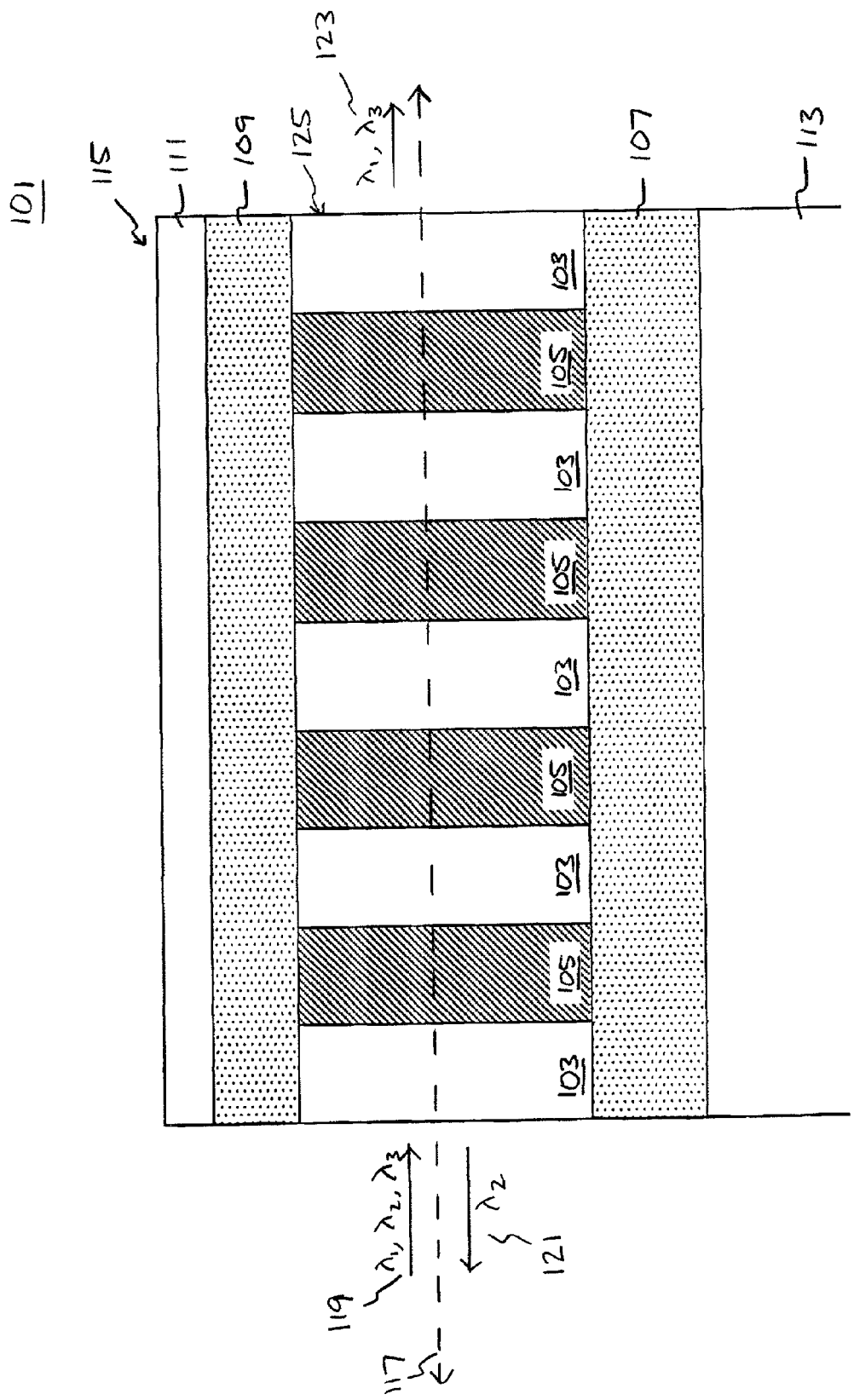
FIG. 1 is a block diagram illustrating a cross section of one embodiment of a tunable Bragg grating disposed in a semiconductor substrate including a heater in accordance with the teachings of the present invention.

To illustrate, FIG. 1 is a block diagram illustrating a cross section of one embodiment of a semiconductor-based tunable Bragg grating 101 disposed in a semiconductor substrate 103 in accordance with the teachings of the present invention. In the depicted embodiment, Bragg grating 101 is silicon/polysilicon grating. It is appreciated that silicon and polysilicon are example materials provided for explanation purposes and that other semiconductor materials including III–V semiconductor materials or the like may be utilized in accordance with the teachings of the present invention. As shown, a plurality of regions of polysilicon 105 are disposed in a silicon semiconductor substrate 103 such that periodic or quasi-periodic perturbations in an effective index of refraction $n_{eff}$ are provided along an optical path 117 through semiconductor substrate 103.

In one embodiment in which silicon and polysilicon are utilized, having effective refractive indexes of $n_{Si}$ and $n_{poly}$, respectively, a small effective refractive index difference $\Delta n_{eff}$ (or $n_{poly}-n_{Si}$) is provided at each interface between semiconductor substrate 103 and polysilicon 105. In one embodiment, $\Delta n_{eff}$ is approximately within the range of 0.005 to 0.01. It is appreciated that other value ranges for $\Delta n_{eff}$ may be utilized in accordance with the teachings of the present invention and that 0.005 to 0.01 is provided herewith for explanation purposes.

As illustrated in FIG. 1, semiconductor substrate 103 is included in one embodiment in a silicon-on-insulator (SOI) wafer 115. As such, an insulating layer 107 or a buried oxide layer is disposed between semiconductor substrate 103 layer and another semiconductor substrate layer 113. In one embodiment, an additional insulating layer 109 is included such that semiconductor substrate 103 layer is disposed between insulating layers 107 and 109. In one embodiment, insulating layer 109 includes an interlayer dielectric layer of the SOI wafer 115. In one embodiment, insulating layers 107 and 109 include an oxide material or the like. As a result, a waveguide 125 including optical path 117 is provided in semiconductor substrate 103 with cladding provided by insulating layers 107 and 109.

Figure 2:
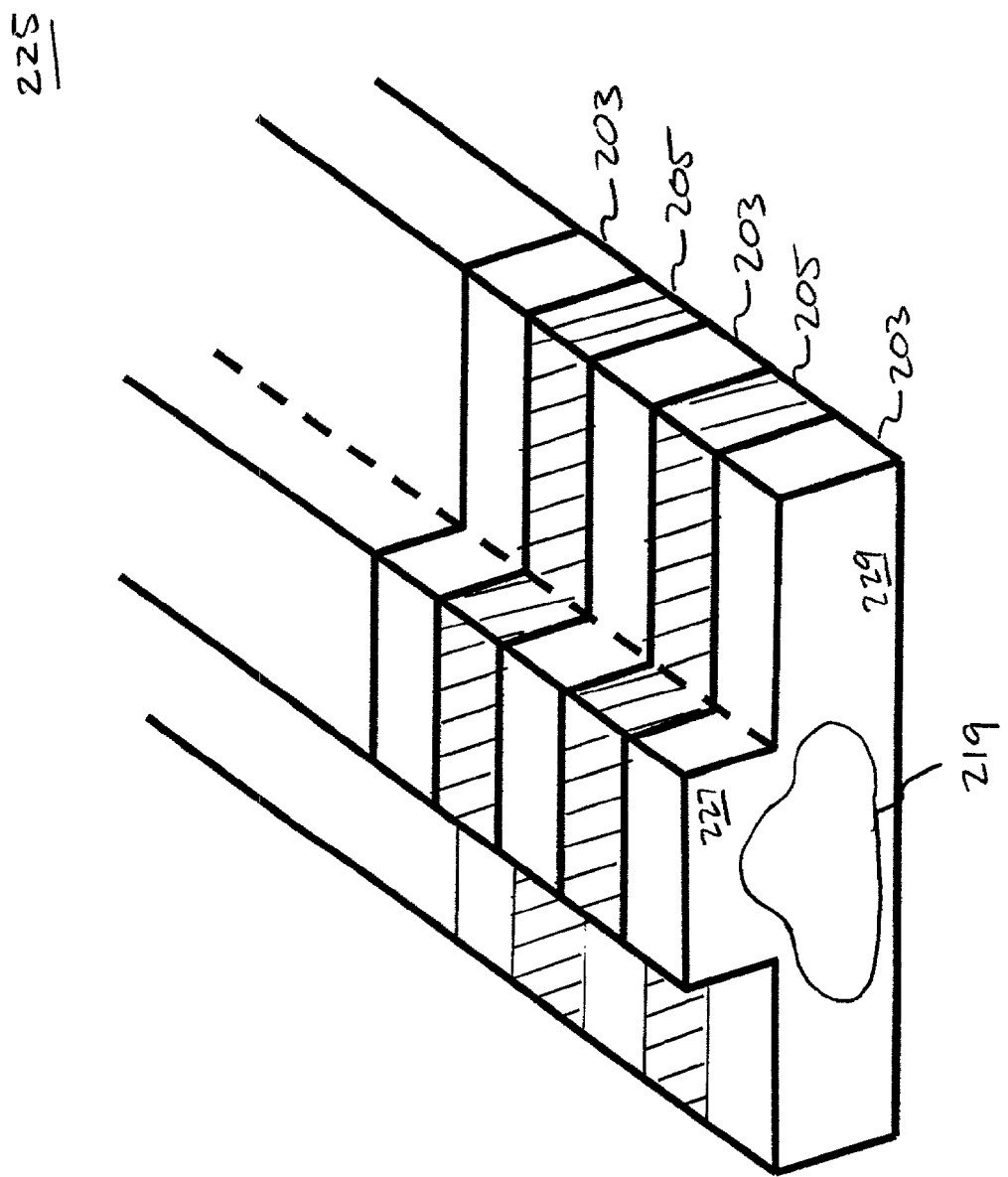
FIG. 2 is a perspective diagram illustrating one embodiment of a tunable Bragg grating disposed in a semiconductor substrate including a rib waveguide disposed in a semiconductor substrate in accordance with the teachings of the present invention.

In one embodiment, waveguide 125 is a rib waveguide. To illustrate, FIG. 2 is a perspective view illustration of one embodiment of a rib waveguide 225 of a tunable Bragg grating in accordance with the teachings of the present invention. In one embodiment, rib waveguide 225 is disposed between insulating regions 107 and 109 of SOI wafer 115 of FIG. 1.

Referring back to FIG. 2, rib waveguide 225 is disposed in a semiconductor substrate 203 and includes regions of polysilicon 205. In one embodiment, the semiconductor substrate 203 has a different index of refraction than polysilicon 205 such that periodic or quasi-periodic perturbations in an effective index of refraction are provided along an optical path through rib waveguide 225.

As shown, the rib waveguide 225 includes a rib region 227 and a slab region 229. In the embodiment illustrated in FIG. 2, the intensity distribution of a single mode optical beam 219 is shown propagating through the rib waveguide 225. As shown, the intensity distribution of optical beam 219 is such that of the majority of the optical beam 219 propagates through a portion of rib region 227 towards the interior of the rib waveguide 225. In addition, a portion of optical beam 219 propagates through a portion of slab region 229 towards the interior of the rib waveguide 225. As also shown with the intensity distribution of optical beam 219, the intensity of the propagating optical mode of beam 219 is vanishingly small at the "upper corners" of rib region 227 as well as the "sides" of slab region 229.

Referring back to the illustration in FIG. 1, an optical beam 119 is directed along optical path 117 into one end of waveguide 125. In one embodiment, optical beam 119 includes infrared or near infrared light and is confined with cladding provided by insulating layers 107 and 109 to remain within waveguide 125 along optical path 117 between the ends of waveguide 125. In one embodiment, optical beam 119 is confined as a result of total internal reflection since the oxide material of insulating layers 107 and 109 has a smaller index of refraction than the semiconductor material of semiconductor substrate 103 and polysilicon 105.

In one embodiment, optical beam 119 includes a plurality of wavelengths including for example $\lambda_1$, $\lambda_2$ and $\lambda_3$. It is appreciated that although optical beam 119 has been illustrated to include three wavelengths $\lambda_1$, $\lambda_2$ and $\lambda_3$ in the illustrated example, a different number of wavelengths may be included in optical beam 119 in accordance with the teachings of the present invention.

As mentioned above, there are periodic or quasi-periodic perturbations in the effective index of refraction along optical path 117 through waveguide 125. As a result of the effective refractive index difference $\Delta n_{\text{eff}}$ described above, a multiple reflection of optical beam 119 occurs at the interfaces between semiconductor substrate 103 and polysilicon 105 along optical path 117. In one embodiment, a Bragg reflection occurs when a Bragg condition or phase matching condition is satisfied. In particular, for uniform Bragg gratings, when the condition $$m\lambda_B = 2n_{\text{eff}}\Lambda,$$ (Equation 1)

is satisfied, where m is the diffraction order, $\lambda_B$ is the Bragg wavelength, $n_{\text{eff}}$ is the effective index of the waveguide and $\Lambda$ is the period of the grating, a Bragg reflection occurs.

To illustrate, FIG. 1 shows a Bragg condition existing for $\lambda_B$ equal to $\lambda_2$. Accordingly, an optical beam 121 including wavelength $\lambda_2$ is shown to be reflected back out of the waveguide 125 out from the end into which optical beam 119 is directed. In addition, the remainder of optical beam 119 continues to propagate along optical path 117 through waveguide 125 such that the remaining wavelengths (e.g. $\lambda_1$ and $\lambda_3$) are included the an optical beam 123, which is propagated from the opposite end of waveguide 125. Accordingly, the Bragg wavelength $\lambda_2$ is filtered from optical beam 123. In one embodiment, optical beam 119 may be an optical communications beam or the like on which data is encoded. In one embodiment, wave division multiplexing (WDM) or dense wave division multiplexing (DWDM) or the like may be employed with optical beam 119 such that a different channel is encoded with each of the wavelengths (e.g. $\lambda_1, \lambda_2, \lambda_3$, etc.) included in optical beam 119.

In one embodiment, the Bragg wavelength, $\lambda_B$, that is reflected or filtered by tunable Bragg grating 101 is tunable or adjustable with a heater 111 disposed proximate to waveguide 125. In an embodiment, heater 111 includes a thin-film heater or the like or other future arising technology that controls the temperature of semiconductor substrate 103 and polysilicon 105 in waveguide 125 along optical path 117. For instance, silicon and polysilicon have large index of refraction variations with temperature on the order of approximately $2 \times 10^{-4}/°$ K. It is appreciated that the index of refraction variations with temperature for semiconductor materials such as silicon and/or polysilicon are two orders of magnitude greater than other materials such as for example silica or the like. Thus, by controlling the temperature of semiconductor substrate 103 and polysilicon 105, relatively significant shifts in the center wavelength of light reflected by a tunable Bragg grating 101 are provided in accordance with the teachings of the present invention.

Figure 3:
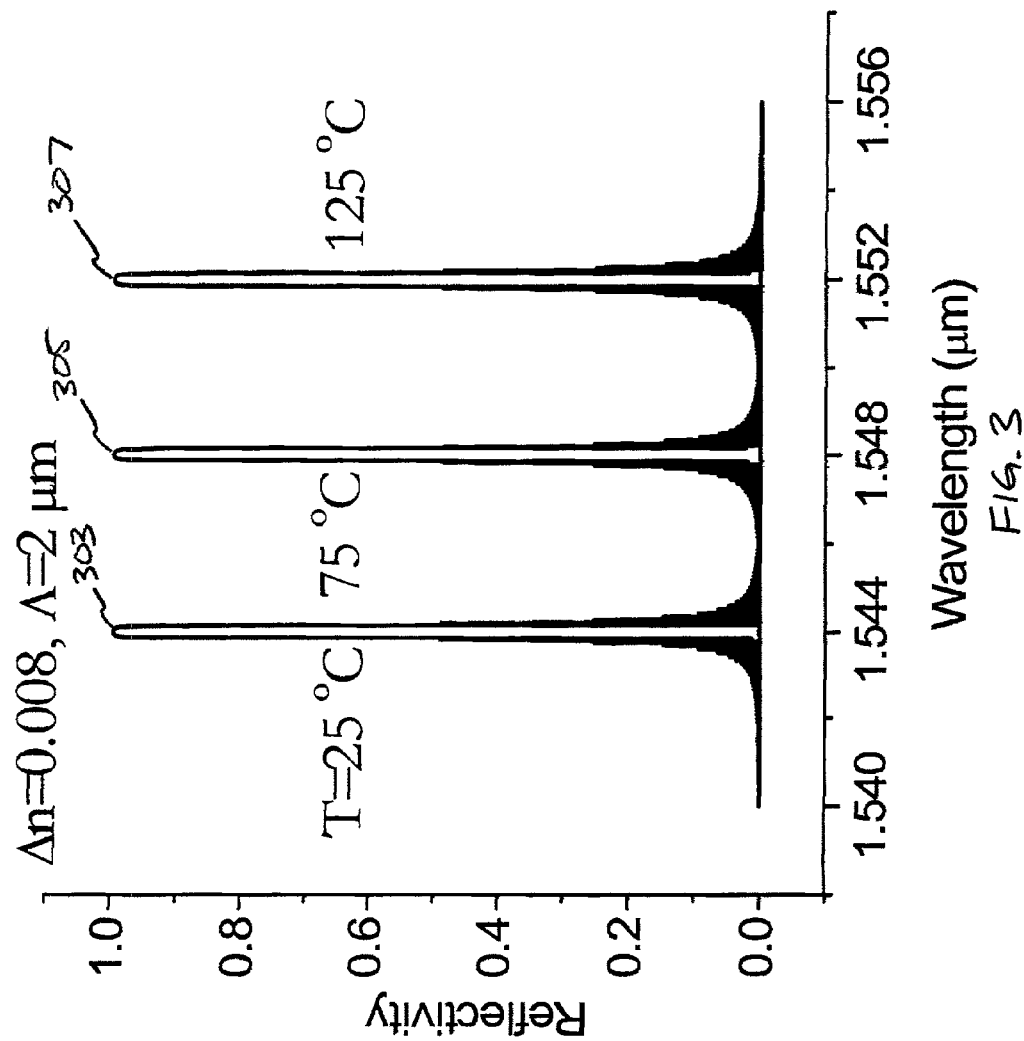
FIG. 3 is a diagram illustrating the relationship between reflectivity and wavelength at different temperatures of one embodiment of a tunable Bragg grating in accordance with the teachings of the present invention.

To illustrate, FIG. 3 is a diagram 301 illustrating the relationship between reflectivity and wavelength at different temperatures of one embodiment of a tunable Bragg grating 101 in accordance with the teachings of the present invention. In the illustrated example, heater 111 is used to adjust the temperature of silicon/polysilicon waveguide Bragg grating to 25° C., 75° C. and 125° C. In the illustrated embodiment, the difference in the effective indexes of refraction between the silicon and polysilicon $\Delta n_{\text{eff}}$ is approximately 0.008 and the period of the grating $\Lambda$ is approximately 2 µm.

Plot 303 shows that at 25° C., the center wavelength of an optical beam that is reflected by the silicon/polysilicon waveguide Bragg grating is approximately 1.544 µm in the illustrated embodiment. In comparison, plot 305 shows that at 75° C., the center wavelength of an optical beam that is reflected is shifted or tuned to be approximately 1.548 µm, while plot 307 shows that at 125° C., the center wavelength of an optical beam that is reflected is shifted or tuned to be approximately 1.552 µm. In one embodiment, a thin-film heater utilized for heater 111 provides center wavelength tuning speeds in the order of microseconds.

It is appreciated of course that the materials, dimensions, wavelengths and index of refraction values utilized in the embodiment illustrated in FIG. 3 are provided for explanation purposes and that other materials, dimensions, wavelengths and index of refraction values may be utilized in accordance with the teachings of the present invention.

Figure 4A:
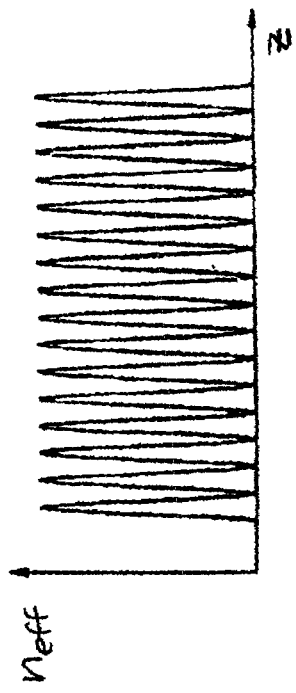
FIG. 4A is a diagram illustrating the effective index of refraction along an optical path of one embodiment of a tunable uniform Bragg grating in accordance with the teachings of the present invention.

In one embodiment, there are sidelobes on the sides of each maxima of plots 303, 305 and 307. When uniform or periodic Bragg gratings are utilized, the sidelobes are usually relatively large. An example of a uniform grating with periodic perturbations in the effective index of refraction along the optical path of the Bragg grating is illustrated in diagram 401 in FIG. 4A. As shown along the y-axis, the effective index of refraction $n_{eff}$ is perturbed periodically or regularly down the optical path, which shown as Z along the x-axis of diagram 401.

Figure 4B:
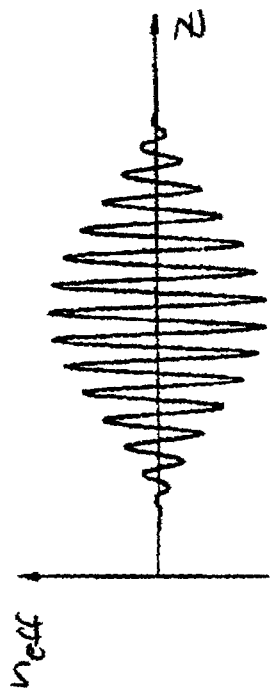
FIG. 4B is a diagram illustrating the effective index of refraction along an optical path of one embodiment of a tunable apodized Bragg grating in accordance with the teachings of the present invention.

In one embodiment, an apodized Bragg grating is provided in accordance with the teachings of the present invention, which reduces the sidelobes on the sides of each maxima of plots 303, 305 and 307. One embodiment of an apodized grating utilized in accordance with the teachings of the present invention is illustrated in diagram 451 of FIG. 4B. An apodized grating is provided with quasi-periodic perturbations in the effective index of refraction along the optical path of the Bragg grating. The perturbation in the effective index of refraction can be realized by either changing refractive index of constitutive materials or varying layer widths (duty cycle) along the Bragg grating. It is noted that an embodiment of a raised-cosine apodized grating is illustrated in diagram 451 of FIG. 4B. It is appreciated that other types of apodized gratings may be utilized in accordance with the teachings of the present invention including but not limited to Gaussian-apodized, chirped, discrete phase shift, superstructure or the like.

Figure 5:
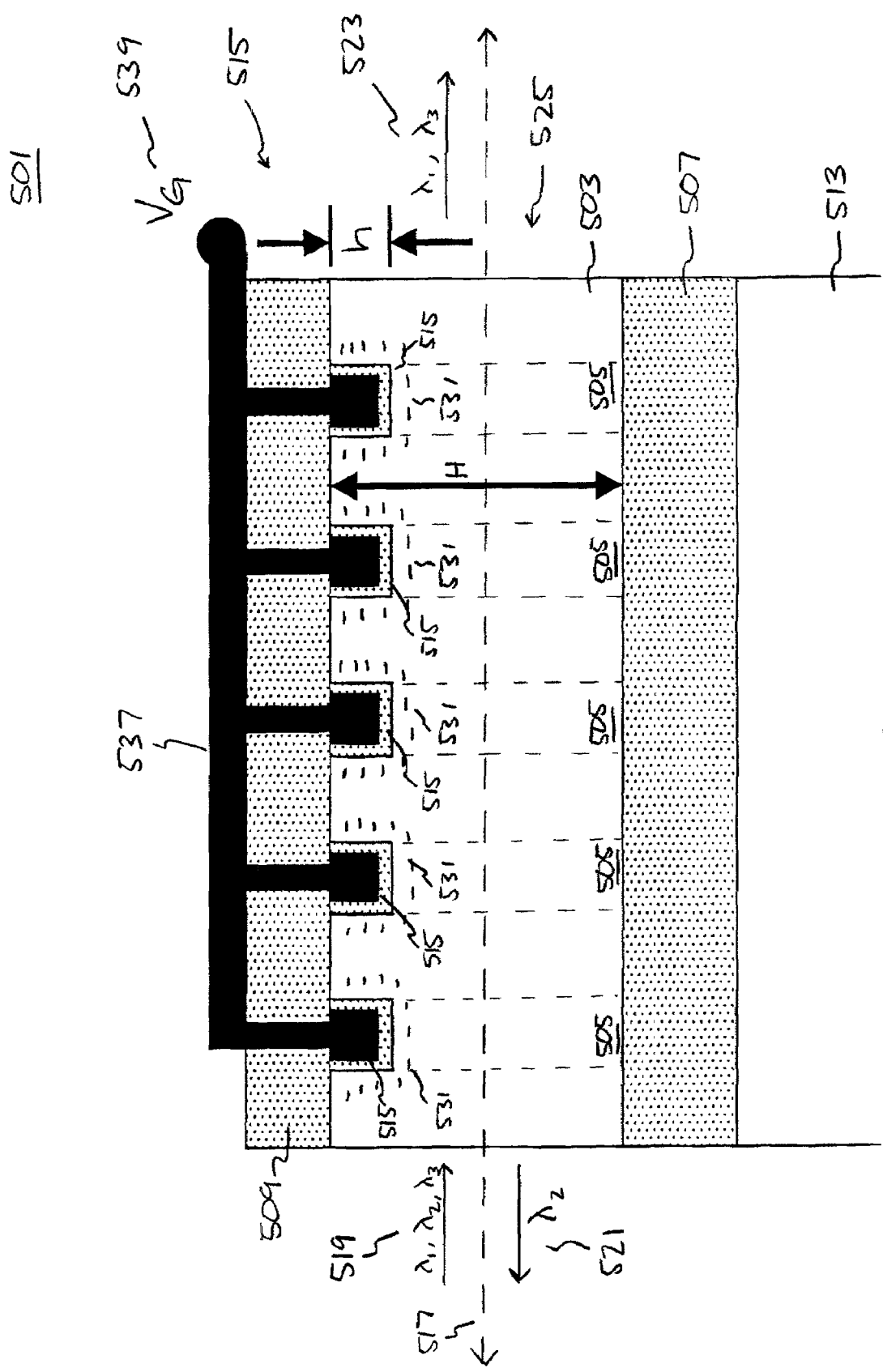
FIG. 5 is a block diagram illustrating a cross section of another embodiment of a tunable Bragg grating disposed in a semiconductor substrate including charge modulated regions in accordance with the teachings of the present invention.

FIG. 5 is a block diagram illustrating a cross section of another embodiment of a tunable Bragg grating 501 in accordance with the teachings of the present invention. As shown in the depicted embodiment, tunable Bragg grating 501 includes a semiconductor substrate 503 having an optical path 517 through which an optical beam 519 is directed. In one embodiment, semiconductor substrate 503 is included in an SOI wafer 515 such that semiconductor substrate is disposed between a buried insulating layer 507 and insulating layer 509. In addition, buried insulating layer 507 is disposed between semiconductor substrate layer 503 and semiconductor substrate layer 513. In one embodiment, an optical waveguide 525 is provided with semiconductor substrate 503 with insulating layers 507 and 509 serving as cladding to confine optical beam 519 to remain within waveguide 525 between the ends.

In the embodiment depicted in FIG. 5, tunable Bragg grating 501 is provided with trenched silicon structures. In particular, a plurality of conductor-insulator-semiconductor structures 515, similar to for example metal-oxide-semiconductor (MOS) structures, are disposed along optical path 517 in semiconductor substrate 503. Each structure 515 is coupled to receive a modulation signal $V_G$ 539 through conductor 537, which is coupled to each structure 515 through insulating layer 509. As shown in FIG. 5, the height of each structure 515 in waveguide 525 is h. In one embodiment, the height h of the structures 515 is chosen such that propagation loss of optical beam 517 in waveguide 525 along optical path 517 is acceptable.

In the embodiment depicted in FIG. 5, periodic or quasi-periodic perturbations in an effective index $n_{eff}$ of refraction are provided along an optical path 517 through waveguide 525 in semiconductor substrate 503. In particular, the effective index of refraction $n_{eff}$ is related or equal to a function of the geometry of waveguide 525 along optical path 517 as well as the index of refraction of the specific medium (e.g. $n_{Si}$) and the wavelength λ included in optical beam 519.

Accordingly, assuming semiconductor substrate 503 includes silicon, the effective index of refraction $n_{eff}$ is a function of the height H of waveguide 525 not including structures 515, $n_{Si}$ and λ. In the regions 505 of waveguide 525 including structures 515, the effective index of refraction $n'_{eff}$ is a function of the height (H−h) of waveguide 525 including structures 515, $n_{Si}$ and λ. Thus, the difference in effective index of refraction $$\Delta n_{eff} = n_{eff} - n'_{eff}.$$ (Equation 2)

In the depicted embodiment, structures 515 are biased in response to modulation signal $V_G$ 539 through conductor 537 such that the concentration of free charge carriers in charge modulated regions 531 in the semiconductor substrate layer 503 proximate to the structures 515. For example, assuming a positive voltage is applied with modulation signal $V_G$ 539 through conductor 537, electrons in semiconductor substrate 503 are swept into charge modulated regions 531. When for example less positive voltage is applied to conductor 537, the concentration of free charge carriers swept into charge modulated regions 531 is reduced.

It is noted that for explanation purposes, charge modulated regions 531 have been illustrated to include negative charge. It is appreciated that in another embodiment, the polarities of these charges and the voltages of modulation signal $V_G$ 539 may be reversed in accordance with the teachings of the present invention.

In one embodiment, the effective index of refraction $n_{eff}$ in charge modulated regions 531 is modulated in response to the modulation signal $V_G$ 539 due to the plasma optical effect. The plasma optical effect arises due to an interaction between the optical electric field vector and free charge carriers that may be present along the optical path 517 of the optical beam 519. The electric field of the optical beam 519 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. In the case of the plasma optical effect in silicon, the effective change in the index of refraction $\Delta n_{eff}$ due to the free electron ($\Delta N_e$) and hole ($\Delta N_h$) concentration change is given by:

$$\Delta n_{eff} = -\frac{e^2 \lambda^2}{8\pi^2 c^2 \varepsilon_0 n_0} \left( \frac{\Delta N_e}{m_e^*} + \frac{\Delta N_h}{m_h^*} \right)$$ (Equation 3)

where $n_o$ is the nominal index of refraction for silicon, e is the electronic charge, c is the speed of light, $\epsilon_0$ is the permittivity of free space, $m_e^*$ and $m_h^*$ are the electron and hole effective masses, respectively.

It is noted that tunable Bragg grating 501 has been illustrated in FIG. 5 with five structures 515. It is appreciated that in other embodiments, tunable Bragg grating 501 may include a greater or fewer number of structures 515 in accordance with the teachings of the present invention.

In operation, optical beam 519 is directed along optical path 517 into one end of waveguide 525. In one embodiment, optical beam 519 includes infrared or near infrared light and is confined with insulating layers 507 and 509 to remain within waveguide 525 along optical path 517 between the ends of waveguide 525. In one embodiment, optical beam 519 is confined as a result of total internal reflection since the oxide material of insulating layers 507 and 509 has a smaller index of refraction than the semiconductor material of semiconductor substrate 503.

In one embodiment, optical beam 519 includes a plurality of wavelengths including for example $\lambda_1$, $\lambda_2$ and $\lambda_3$. As a result of the effective refractive index difference $\Delta n_{eff}$ described above in the periodic or quasi-periodic perturbations in the effective index of refraction along optical path 517, a multiple reflection of optical beam 519 occurs when a Bragg condition or phase matching condition is satisfied, as described above in Equation 1.

To illustrate, FIG. 5 shows a Bragg condition existing for $\lambda_B$ equal to $\lambda_2$. Accordingly, an optical beam 521 having a center wavelength $\lambda_2$ is shown to be reflected back out of the waveguide 525 out from the end into which optical beam 519 is directed. In addition, the remainder of optical beam 519 continues to propagate along optical path 517 through waveguide 525 such that the remaining wavelengths (e.g. $\lambda_1$ and $\lambda_3$) are included the an optical beam 523, which is propagated from the opposite end of waveguide 525. Accordingly, the Bragg wavelength $\lambda_2$ is filtered from optical beam 523.

In one embodiment, the center wavelength that is reflected or filtered by tunable Bragg grating 501 is tunable or adjustable by appropriately modulating charge in modulated charge regions 531 with modulation signal $V_G$ 539 to adjust the conditions for the Bragg wavelength $\lambda_B$. Indeed, as discussed above, the difference in effective refractive index $\Delta n_{eff}$ along optical path 517 is modulated in response to modulation signal $V_G$ 539 to tune the Bragg wavelength $\lambda_B$ that is reflected or filtered by tunable Bragg grating 501 in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
   directing an optical beam into a first end of an optical path having the first end and a second end disposed in a semiconductor substrate;
   reflecting a first portion of the optical beam having a first center wavelength back out from the first end of the optical path with first and second pluralities of silicon and polysilicon interfaces, respectively, disposed in the semiconductor substrate along the optical path between the first end and the second end, the first and second pluralities of silicon and polysilicon interfaces oriented substantially perpendicular to the semiconductor substrate; and
   tuning the optical path to reflect a second portion of the optical beam having a second center wavelength back out from the first end of the optical path.

2. The method of claim 1 further comprising confining the optical beam to remain within the optical path between the first and second ends with an optical waveguide disposed in the semiconductor substrate between the first and second ends.

3. The method of claim 2 wherein confining the optical beam to remain within the optical waveguide comprises forming the optical waveguide with dielectric layers of a silicon-on-insulator wafer.

4. The method of claim 1 wherein tuning the optical path comprises adjusting a temperature of the first and second pluralities of silicon and polysilicon interfaces with a heater disposed proximate to the optical path through the semiconductor substrate.

5. The method of claim 1 wherein the first and second pluralities of silicon and polysilicon interfaces in the semiconductor substrate along the optical path form a Bragg grating.

6. A method, comprising:
   directing an optical beam into a first end of an optical path having the first end and a second end disposed in a semiconductor substrate;
   reflecting a first portion of the optical beam having a first center wavelength back out from the first end of the optical path by perturbing an effective index of refraction a plurality of times along the optical path with a plurality of insulated conductor structures protruding into the optical path; and
   tuning the optical path to reflect a second portion of the optical beam having a second center wavelength back out from the first end of the optical path.

7. The method of claim 6 wherein perturbing the effective index of refraction the plurality of times along the optical path comprises applying a voltage to the plurality of insulated conductor structures to perturb a concentration of free charge carriers a plurality of times along the optical path.

8. The method of claim 6 wherein tuning the optical path comprises modulating charge in the optical path by modulating a voltage applied to the insulated conductor structures.

9. The method of claim 8 wherein confining the optical beam with the optical waveguide comprises forming the optical waveguide with dielectric layers of a silicon-on-insulator wafer.

10. The method of claim 6, further comprising confining the optical beam to remain within the optical path between the first and second ends with an optical waveguide disposed in the semiconductor substrate between the first and second ends.

11. The method of claim 6 wherein perturbing an effective index of refraction a plurality of times along the optical path with a plurality of insulated conductor structures protruding into the optical path forms a Bragg grating.

12. A method, comprising:
   directing an optical beam into a first end of an optical path having the first end and a second end disposed in a semiconductor substrate;
   reflecting a first portion of the optical beam having a first center wavelength back out from the first end of the optical path with at least three silicon and polysilicon interfaces disposed in the semiconductor substrate along the optical path between the first end and the second end, the at least three silicon and polysilicon interfaces forming a Bragg grating; and
   tuning the at least three silicon and polysilicon interfaces to reflect a second portion of the optical beam having a second center wavelength back out from the first end of the optical path.

13. The method of claim 12 wherein the at least three silicon and polysilicon interfaces are oriented substantially perpendicular to the semiconductor substrate.

14. The method of claim 13 wherein tuning the at least three silicon and polysilicon interfaces comprises adjusting a temperature of the at least three silicon and polysilicon interfaces with a heater disposed proximate to the optical path through the semiconductor substrate.

* * * * *